United States Patent
Edgman

(10) Patent No.: US 6,692,815 B2
(45) Date of Patent: Feb. 17, 2004

(54) EXTRUDED PLASTIC LUMBER AND METHOD OF MANUFACTURE

(75) Inventor: Thomas J. Edgman, Farmers Branch, TX (US)

(73) Assignee: Vinylex Corporation, Knoxville, TN (US)

( * ) Notice: Subject to any disclaimer, the term of this patent is extended or adjusted under 35 U.S.C. 154(b) by 71 days.

(21) Appl. No.: 09/882,830

(22) Filed: Jun. 15, 2001

(65) Prior Publication Data

US 2002/0192431 A1 Dec. 19, 2002

(51) Int. Cl.[7] .............................. B32B 3/28; B32B 3/30; B32B 1/04; B32B 3/02; B32B 21/04
(52) U.S. Cl. ................. 428/181; 428/182; 428/184; 428/186; 428/176; 428/114; 428/105; 428/76; 428/68; 428/541; 428/537.1
(58) Field of Search ............... 428/181, 182, 428/184, 186, 76, 68, 541, 537.1, 176, 105, 114

(56) References Cited

U.S. PATENT DOCUMENTS

| | | | | |
|---|---|---|---|---|
| 4,119,750 A | * | 10/1978 | Porter | 428/105 |
| 4,409,274 A | * | 10/1983 | Chaplin et al. | 428/112 |
| 4,631,215 A | * | 12/1986 | Welygan et al. | 428/105 |
| 5,480,602 A | * | 1/1996 | Nagaich | 264/122 |
| 5,516,472 A | * | 5/1996 | Laver | 264/118 |
| 6,080,495 A | * | 6/2000 | Wright | 428/623 |
| 6,153,293 A | * | 11/2000 | Dahl et al. | 428/310.5 |

* cited by examiner

*Primary Examiner*—Harold Pyon
*Assistant Examiner*—Catherine A. Simone
(74) *Attorney, Agent, or Firm*—Gardere Wynne Sewell LLP

(57) ABSTRACT

A composite reinforced plastic lumber article, having a generally rectangular cross-section, is formed by extruding a wood particle/polymer composition through an extrusion die which forms a corrugated or relatively thin sheet cross-section core part. The core part is compressed to push corrugations closer together and then cooled in a two-stage cooling process with water spray and submersion followed by vacuum and air blast drying of the article, followed by extruding an outer coating of the same composition over the core part. A continuous plank-like composite article is thus formed and is cooled after the outer coating is extruded over the core part. Opposed surfaces of the article may be embossed to provide a woodgrain appearance. The two-stage article forming process provides rapid cooling of the material to enhance the speed of production of reinforced plastic lumber articles.

9 Claims, 5 Drawing Sheets

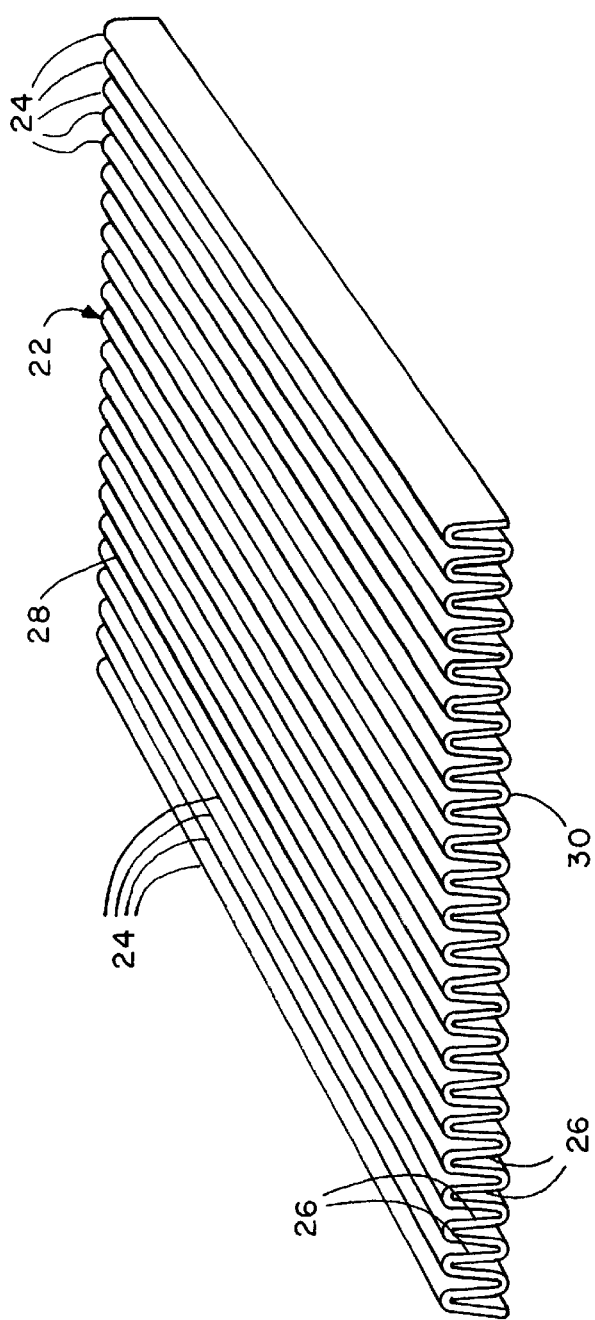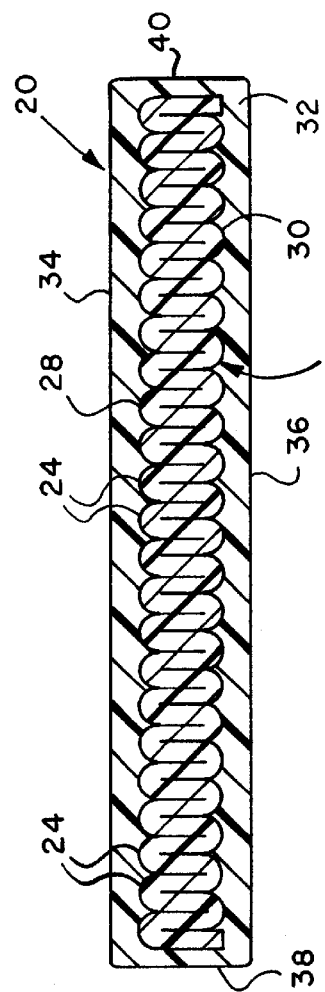
FIG. 1
FIG. 2

EXTRUDED PLASTIC LUMBER AND METHOD OF MANUFACTURE

BACKGROUND OF THE INVENTION

Structural composite lumber or so-called plastic wood products have been developed in recent years wherein the composite structures are characterized by reinforced polymer compositions. So-called plastic lumber, for example, has been developed wherein wood fibers or wood flour is mixed with polymer materials, such as polypropylene or polyethylene, to form a composition which can be extruded into structural shapes, including conventional sizes and shapes of lumber. The advantages of such types of plastic lumber include high strength, rot resistance and ease of fabrication.

However, one disadvantage of prior art composite shapes comprising so-called plastic wood or plastic lumber, is competitive costs resulting from the cost of raw material but primarily resulting from the speed with which the so-called plastic wood shapes can be fabricated as compared with conventional lumber. Wood flour or wood particle/polymer compositions must be heated to substantial temperatures to perform extrusion processes required to form the structural shapes of plastic lumber. The speed of plastic lumber manufacturing processes has not, in many instances, been sufficient to make plastic lumber competitive with conventional lumber due to the relatively slow extrusion speeds required to allow the temperature of plastic or similar composite articles to be reduced to a level which will permit final fabrication and storage in an economical manner.

For example, the cross-sectional thickness of most types of conventional plastic lumber shapes is such that heat transfer from the core portion of the article being manufactured is not sufficient to allow finish processing of the article at a speed which is cost competitive with conventional lumber. Polymer materials used in fabricating conventional plastic lumber or plastic wood shapes have a relatively low heat transfer rate and the core temperature of conventional plastic lumber shapes remains too high to permit processing of the material at a competitive rate. However, in accordance with the present invention an improved composite or plastic lumber article is provided which is fabricated by an improved process, also in accordance with the invention.

BRIEF SUMMARY OF THE INVENTION

The present invention provides a composite or so-called plastic wood or plastic lumber article which may be fabricated in selected conventional cross-sectional shapes and dimensions. The present invention also provides an improved method for fabricating extruded composite structural articles, such as so-called plastic lumber.

In accordance with one aspect of the present invention, a composite, extruded lumber or extruded plastic wood article is provided which may be of a conventional cross-sectional shape, that is a rectangular cross-sectional shape of standard lumber dimensions, and which is characterized by a corrugated composite core part encapsulated in an outer layer of composite material to form a conventional cross-sectional shape of standard lumber dimensions, for example. The plastic lumber article may be fabricated using an extrudable polymer material which is reinforced by a wood particle or wood flour filler. The extruded plastic lumber articles may also be fabricated using other types of filler or reinforcement materials, such as glass fibers or other reinforcing fibers. Metal foil or sheet may also be encapsulated in or comprise part of the extruded plastic lumber article.

In accordance with another aspect of the invention, conventional lumber shaped articles are provided which include a corrugated core portion of composite material encapsulated within an outer layer of composite material and which are fabricated in a way which increases the speed of production of the articles. By way of example, a composite plastic board of a type used as a conventional fence picket may be fabricated by extruding a corrugated core part, cooling the core part and compressing the corrugations toward each other and then encapsulating the core part within an outer layer of material to form a so-called plastic lumber article having conventional cross-sectional dimensions of board width and thickness. Moreover, the composite lumber article may be cut to any specified length in a conventional manner and may be otherwise worked in the same manner as a conventional wood structural article.

The present invention further contemplates a method of fabricating composite or reinforced polymer structural articles, such as conventional lumber shapes, by extruding a reinforced plastic core part from a first extrusion die, cooling the core part and then encapsulating the core part by extruding an overlay of the same or similar composite material to form the final dimensions of the article. The time required to fully fabricate the article and to cool the article to a temperature where it may be worked further or placed in storage without any deleterious effects is minimized as compared with prior art methods.

In a preferred embodiment, a core part of the article is extruded from a first extrusion die as a corrugated, or zigzag cross-sectional shape, or is subsequently formed into such a shape to provide for rapid cooling of the extrudate, initially. The corrugated shape is compressed and guided by respective sets of guides to bring the folds or corrugations substantially contiguous with each other, after initial extrusion and cooling, and so as to maintain the desired flatness and size of the core shape prior to further working. The continuous extruded and compressed core part is then subjected to further cooling via a liquid spray, followed by submersion of the core part in cooling liquid, normally water, as it is being pulled from the extruder. The core part is guided through the cooling liquid spray by spaced apart sets of guide rollers to maintain flatness and sizing of the core part.

The continuous composite core part of the article is then passed through a dryer comprising a vacuum chamber and pressure air blowers to remove moisture from the core part. In a preferred arrangement of the processing apparatus, the core part is then passed through a conveyor type puller apparatus characterized by opposed endless belts which grip and traverse the core part along a fabrication path.

In accordance with a further aspect of the present invention, the composite extruded core part of the structural article is then passed through a second die wherein a coating of a second composition, preferably the same as the core part, is applied over the core part to completely encapsulate the core part. The article may then be passed through a set of rollers for final sizing of the article cross-sectional shape to provide sharp edges and flat surfaces, for example. The continuous article, after sizing, enters an elongated cooling trough filled with cooling liquid, preferably water, followed by exit from the cooling trough and passage through an air blast curtain to remove water from the surface of the cooled and finished article. Prior to cooling, the article may be passed through one or more sets of embossing rollers to emboss the outer surfaces of the article to provide a woodgrain appearance, for example. Still further, a continuous belt-type pulling apparatus may be disposed downstream, in the direction of movement of the continuous extrudate, from the cooling water trough. The continuous finished composite lumber article may then be cut to length by a conventional sawing apparatus.

The composition of the article of the present invention may be somewhat varied. Conventional polymers used for extruded shapes may be used in forming the article and such polymers may be reinforced by various reinforcement materials including wood fibers, wood flour and fibers of other compositions including glass, carbon and the like.

Those skilled in the art will further appreciate the above-mentioned advantages and superior features of the invention together with other important aspects thereof upon reading the detailed description which follows in conjunction with the drawing.

BRIEF DESCRIPTION OF THE SEVERAL VIEWS OF THE DRAWINGS

FIG. 1 is a perspective view showing a portion of a core part of an extruded composite or plastic lumber article in accordance with the invention;

FIG. 2 is a cross-section of a finished composite or plastic wood or lumber article in accordance with the invention;

FIG. 5 is a detail plan view in somewhat schematic form of the first stage liquid cooling apparatus for the system shown in FIG. 3;

FIG. 7A is a cross section view of the finished article shown in fabrication in FIG. 7.

DETAILED DESCRIPTION OF THE PREFERRED EMBODIMENTS

Figure 3:
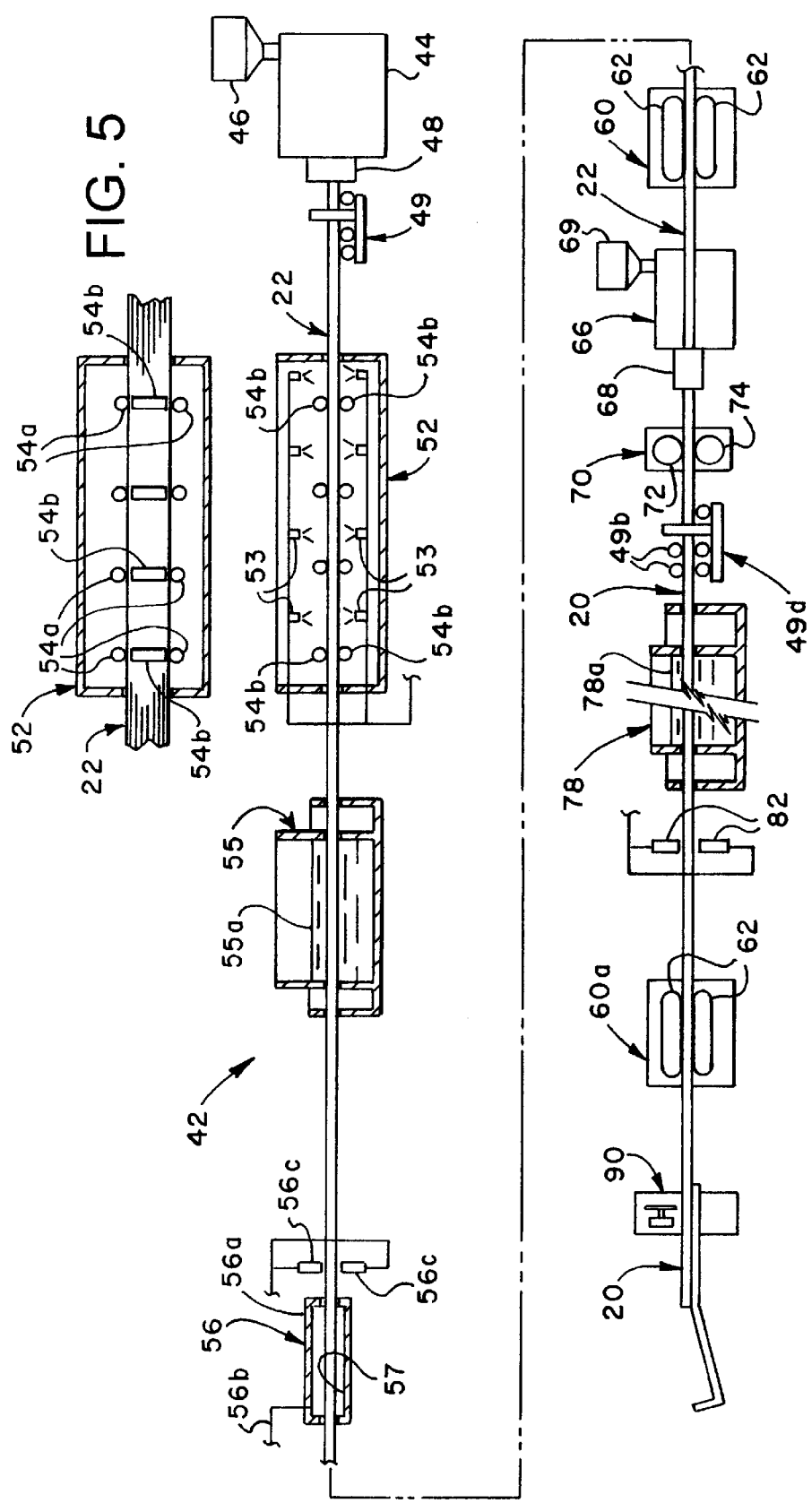
FIG. 3 is a general schematic diagram of a system for forming the extruded composite or plastic lumber article in accordance with the invention.

In the description which follows, like parts are marked throughout the specification and drawing with the same reference numerals, respectively. The drawing figures are not necessarily to scale and certain features may be shown in somewhat schematic form in the interest of clarity and conciseness.

Referring to FIGS. 1 and 2, there is illustrated a composite plastic wood or lumber article in accordance with the invention and generally designated by the numeral 20, FIG. 2. The article 20 is, by way of example, characterized as a generally rectangular cross-section plank or board which may have suitable dimensions for a finished standard lumber article for use as fence pickets. Those skilled in the art will recognize that various cross-sectional dimensions of width and thickness may be provided in fabricating various types of composite or plastic lumber articles, and the like, in accordance with the invention.

As shown in FIGS. 1 and 2, the plastic lumber article 20 includes a core part 22 formed of continuous folds or corrugations 24. The corrugations 24 are shown in FIG. 1 spaced apart and adjacent each other to leave opposed relatively shallow elongated parallel valley portions or recesses 26 on opposite sides 28 and 30 of the core part. FIG. 2 further shows the plastic lumber article 20 with an outer coating 32, which completely encapsulates the core part 22 and provides finished, opposed, parallel spaced apart, outer surfaces 34 and 36 and opposed, finished, parallel and spaced-apart outer surfaces 38 and 40 forming a conventional rectangular cross-section lumber article in accordance with the invention. The cross-section thickness of the corrugations of the core part 22 may vary from about 0.060" to about 0.200". For a lumber article having a width of about 3.20 inches and a thickness of about 0.40 inches delimited by surfaces 38 and 40 and surfaces 34 and 36, respectively, the thickness of the corrugations 24 is preferably about 0.085".

The plastic or composite lumber article 20 may be formed of different compositions. For example, a preferred composition is a mixture of about 75% polypropylene and 25% wood flour, by weight. However, the reinforcing material may be other than wood flour including wood fibers, glass fibers, carbon fibers or other reinforcing fibers or particles, for example. The polymer material may also comprise polyethylene or another selected polymer. However, for purposes of general applications of conventional lumber articles, the above-mentioned wood flour/polypropylene composition is one which is preferred.

Referring now to FIG. 3, a system for fabricating the composite or plastic lumber article 20 is illustrated and generally designate by the numeral 42. The system 42 includes a first extruder 44 of a type commercially available, such as a single or twin screw extruder by Davis Standard of Pawcatuck, Conn. Extruder 44 is adapted to receive material prepared for forming the core part 22 of article 20 by way of a suitable feeder hopper 46. The raw material used for fabricating the article 20 may comprise, for example, preformed pellets of 25% wood flour and 75% polypropylene polymer by weight. Extruder 44 is adapted to extrude the heated polymer/wood flour composition to an extruder discharge temperature of about 380° F., for example. The core portion or part 22 is formed by an extrusion die 48, which is mounted on the extruder 44 at a suitable discharge opening for the heated composition described above. The die 48 includes a die orifice having a cross-sectional shape corresponding to the shape of the corrugated core part 22 wherein the corrugations 24 are spread further apart than in the finished article shown in FIG. 2.

Figure 4:
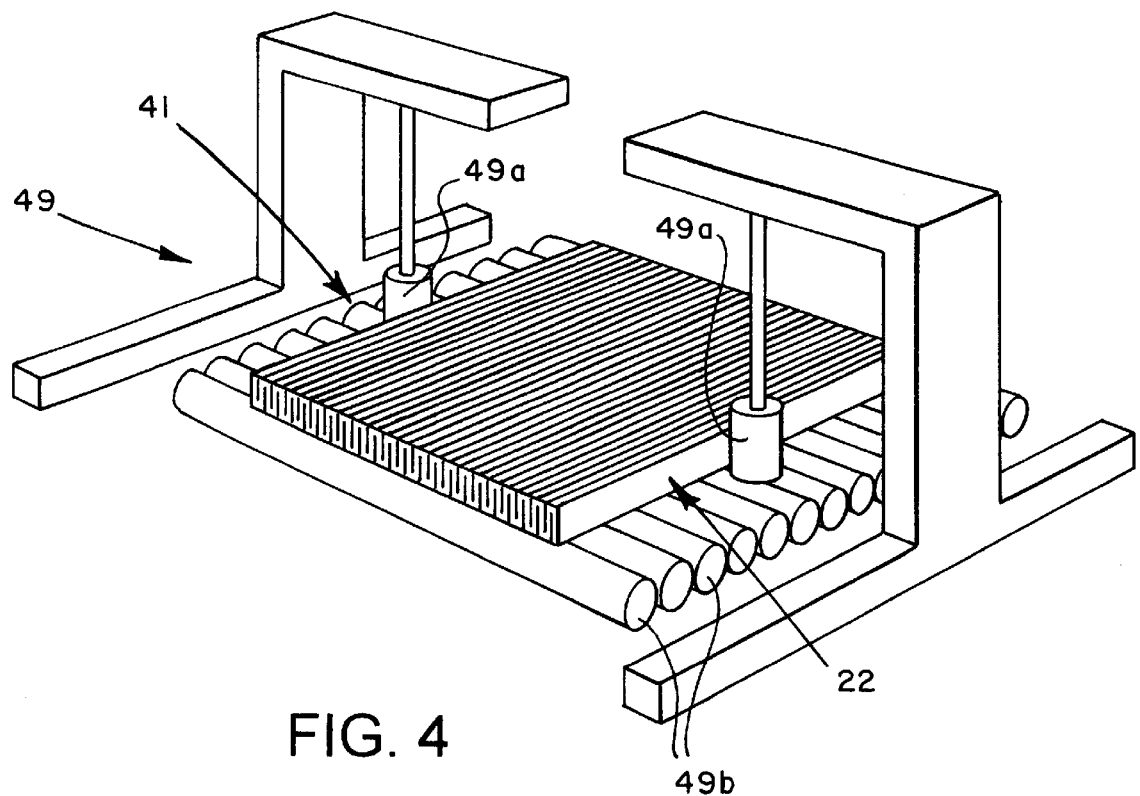
FIG. 4 is a detail perspective view of a set of guide rollers for compressing and guiding the corrugated core part of the article of the present invention.

As the heated plastic material is extruded from the die 48 to form core part 22, it traverses a short distance unsupported and then is preferably guided by apparatus 49, including opposed sets of guide rollers 49a and a set of support rollers 49b, see FIG. 4 also, to compress the corrugations or folds 24 closer together so that the grooves or valleys 26 are substantially eliminated to approximate the finished core part 22, as shown in FIG. 2. In other words, the corrugations 24 are moved together or contiguous with each other as shown in FIG. 2.

As the heated core material is extruded through the die 48 into ambient atmospheric conditions at normal room temperature, some cooling effect takes place before any guide rollers described above compress the corrugations 24 closer together, thanks to the decreased thickness and increased surface area of the core part 22 provided by the corrugations 24. However, the continuous extruded core part 22 then enters a generally rectangular box-like, elongated cooling tank 52, FIGS. 3 and 5, in which spaced-apart sets of water spray nozzles 53 are arranged to eject a water spray on at least top and bottom sides of the core part. Spaced apart sets of opposed guide rollers 54a and 54b are suitably mounted within the tank 52 for supporting the continuous core part 22 as it is extruded from the extruder 44 and to guide and support the core part to maintain its final cross-section dimension. For example, the core part 22 may not be substantially reduced in thickness after it is extruded from the extruder 44 but is reduced in width by compressing the corrugations 24 closer together at the apparatus 49 wherein the width is reduced to approximately 55% of the width of the core part exiting the extruder die 48.

As the continuous extruded core part 22 is passed through the tank 52, the temperature of the core part is reduced to about 200° F. A second liquid coolant tank 55, FIG. 3, is mounted adjacent the discharge end of tank 52 and is adapted to guide the continuous core part 22 therethrough while submerged in a water bath 55a. Spaced-apart sets of top and bottom and side-to-side guide rollers, not shown, may be provided in the tank 55 to provide further guidance and support for the continuous extrusion of the core part 22 as it passes through the tank 55.

Referring further to FIG. 3, the system 42 provides for removing moisture from the core part 22 as it exits tank 55, including an apparatus 56, which includes a generally rectangular hollow plate or box 56a, including an elongated vacuum chamber or slot 57 formed therein. Apparatus 56 is suitably connected to a source of vacuum 56b so that, as the core part 22 passes through the box 56a, moisture on the core part is evaporated and withdrawn therefrom. A suitable array of opposed air blast nozzles 56c may also be provided, see FIG. 3, and connected to a source of pressure air, not shown, for assisting in the removal of water from the surfaces of the core part 22 before it passes into the vacuum chamber or slot 57 of apparatus 56.

The somewhat firm and cooled core part 22 is then passed through a device 60, FIG. 3, including opposed motor driven endless conveyor belts 62 between which the core part 22 is disposed and engaged by for traversing the core part in timed relationship to the rate at which the extruder 44 is extruding the core part therefrom, so that the continuous core part 22 will not buckle or be stretched out of its preferred shape.

Figure 6:
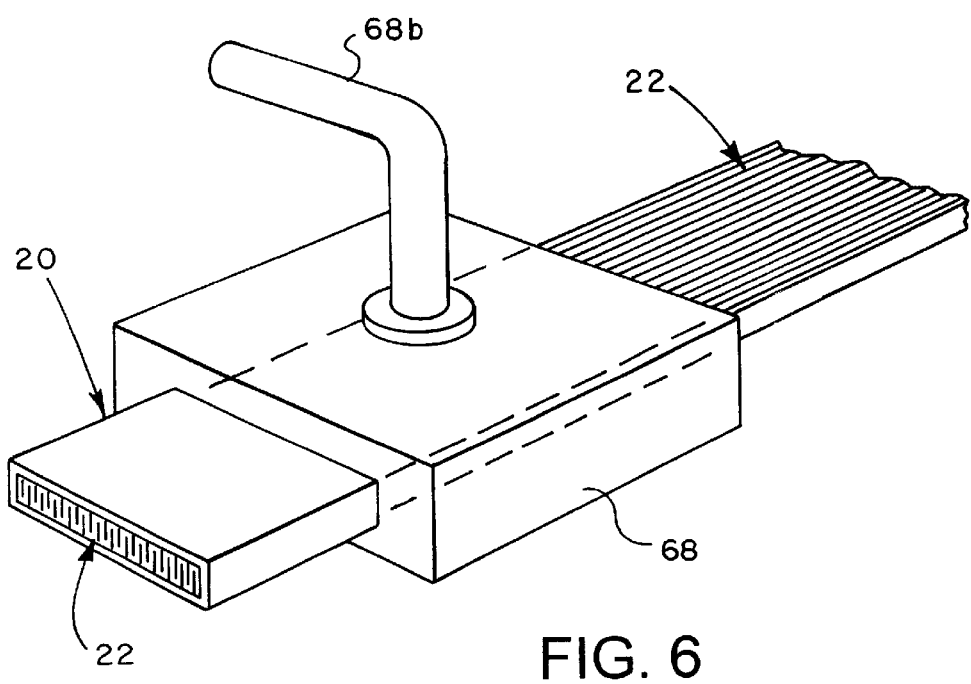
FIG. 6 is a detail perspective view of the second stage extrusion die for the system shown in FIG. 3.

Referring still further to FIG. 3, the system 42 includes a second extruder apparatus 66 including an extruder die 68, see FIG. 6 also, into which the core part 22 is extended. The extruder 66 also includes a coating material receiving hopper 69 for receiving raw coating material in pellet form, for example, preferably having the same composition as the material used to form the core part 22. Flowable coating material is injected into die 68 via conduit means 68b, FIG. 6, to completely envelope core part 22 with material which becomes coating 32, FIG. 2. As the core part 22 passes through the extruder die 68, the coating 32 is applied thereover to completely encapsulate the core part and to form the opposed surfaces 34, 36, 38 and 40. For the dimensions of the article 20, the coating is confined to a thickness of approximately 0.10".

Extruded article 20, now having the opposed finished surfaces 34, 36, 38 and 40 formed thereon, may then be passed through an apparatus 70, FIG. 3, including opposed rollers 72 and 74 which have suitable die surfaces thereon to provide embossing on surfaces 34 and 36, for example, to simulate woodgrain, if desired. Other decorative or textured surfaces may be provided by modified rollers similar to the rollers 72 and 74. The rollers 72 and 74 are preferably water cooled to provide some further cooling of the article 20 as it exits the extruder die 68.

After passing through the apparatus 70, the extruded article 20 is also passed through an apparatus 49d, similar to apparatus 49 and including a set of opposed rollers 49a and a second set of opposed rollers 49b for final sizing of the article to provide substantially flat and parallel surfaces 34 and 36 and 38 and 40, respectively. Apparatus 49d is substantially like apparatus 49, FIG. 4, but may include opposed sets of rollers 49b above and below article 20. Alternatively, apparatus 49d may include only opposed sizing rollers 49a. The positions of rollers 49a and 49b are adjusted to accommodate the preferred dimensions of article 20.

After passing through the sizing roller sets for apparatus 49d as just described, the continuous extruded article 20 is passed through a further cooling apparatus 78, FIG. 3, comprising an elongated water filled tank for final cooling of the article. Article 20 is preferably submerged in a cooling water bath 78a in tank 78. Upon exiting the tank 78, continuous article 20 is subjected to an air blast from an array of air jet nozzles 82 or the like, FIG. 3, to remove further moisture from the surfaces of the article. Continuous feeding of the article 20 through the system 42 is aided by a second traversing apparatus 60a having opposed motor driven endless belts 62 which are spaced apart sufficiently to engage surfaces 34 and 36, respectively, to feed the continuous article 20 at the same speed as the core part 22 is being fed by the apparatus 60. Lastly, a controllable power saw 90 may be disposed downstream of the apparatus 60a for sawing the article 20 into predetermined lengths as the article 20 is ejected from the feed or traversing apparatus 60a.

Thanks to the construction of the composite plastic wood or lumber, article 20, as illustrated and described, the core part 22 of the article and coating 32 are cooled faster than if the entire cross-section of the finished article were formed in one extrusion operation. In this way, production speeds for extruding and finishing the article 20 may be increased. For an article 20 having the dimensions and composition described herein, the speed at which the article 20 is traversed through the system 42 shown and described may be in a range of about fifteen feet per minute to one hundred fifty feet per minute. Accordingly, by forming the core part 22 in the manner shown and described and, cooling same to a substantially reduced temperature, then extruding an overlay of reinforced polymer to encapsulate the core part and then cooling the finished article, an improved high strength composite plastic wood or lumber article may be fabricated efficiently and with a speed of manufacture sufficient to be cost competitive with conventional milled wood products. However, the composite plastic lumber article 20 enjoys all of the advantages of polymer based, or so-called plastic products.

Figure 7:
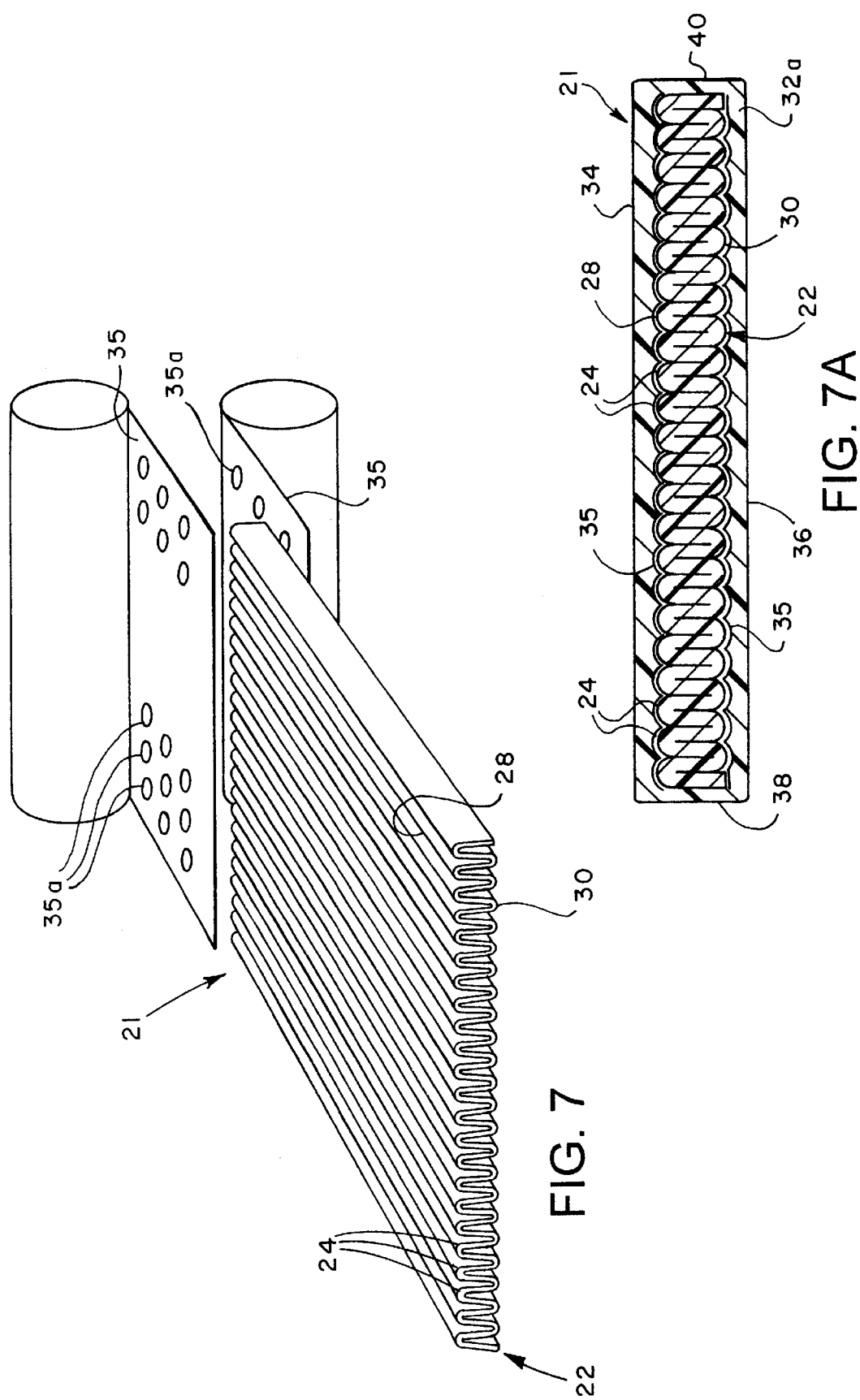
FIG. 7 is a detail perspective view showing a portion of the process of fabricating an alternate embodiment of an article according to the present invention.

Referring to FIGS. 7 and 7A, a second embodiment of a composite plastic article in accordance with the invention is illustrated and generally designated by the numeral 21. The article 21 includes a core part 22, formed in the same manner as the core part for the article 20, and adapted to be encapsulated within an outer layer 32a, FIG. 7A, of composite material of the same composition. However, the composite or so-called plastic lumber article 21 also includes one or opposed layers 35 of metal foil, preferably aluminum, adapted for overlying the opposite sides 28 and 30 of the core part 22, contiguous therewith and encapsulated by the aforementioned coating or outer layer 32a. The aluminum foil overlays or layers 35 are preferably perforated at perforations 35a, FIG. 7, over their entire surface to provide for the article outer layer or coating 32a to be contiguous with the surfaces of the core part 22 to form a suitable chemical and mechanical bond thereto. Accordingly, the composite or plastic lumber article 21 in accordance with the invention enjoys the benefits of the article 20 but is of enhanced strength due to the metal foil or sheet overlays 35 encapsulated between the coating or outer layer 32a and the core part 22. The overlays 35 may also be formed in such a way as to enhance the appearance of the article 21 as well as its strength, particularly if the outer layer or coating 32a is relatively clear and free of reinforcement materials dispersed throughout.

Figure 8:
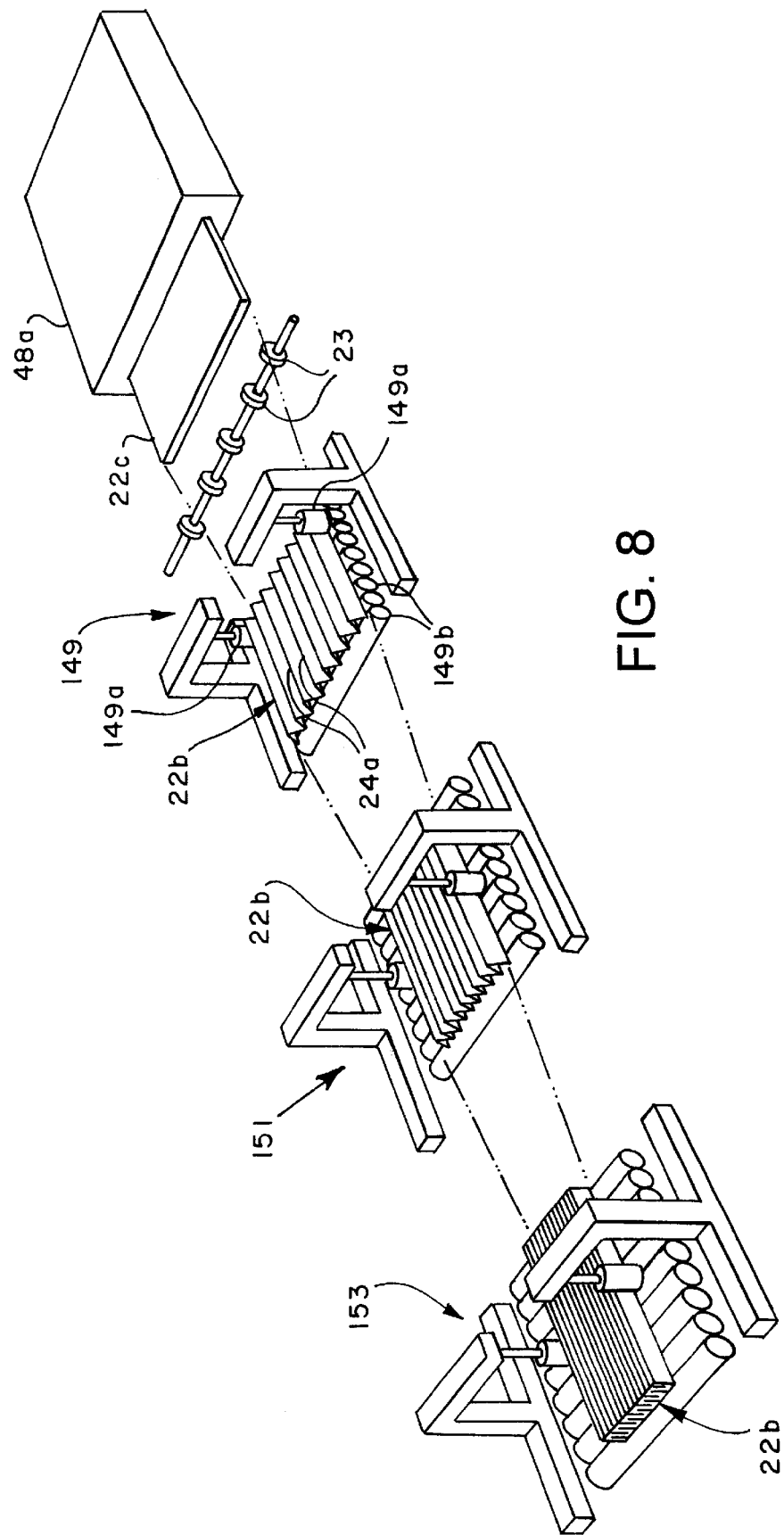
FIG. 8 is a perspective view, in somewhat schematic form, illustrating a further alternate embodiment of an article, system and method in accordance with the invention.

Referring now to FIG. 8, another embodiment of the invention is illustrated wherein a plastic lumber article core part 22b is formed by extruding a thin rectangular sheet 22c of the same material as that which forms the core part 22. Sheet 22c is extruded from a modified extruder die 48a adapted to be associated with the extruder 44 in place of the die 48. Extruder die 48a thus forms a thin rectangular cross section sheet 22c which is then forced to form corrugations 24a. Corrugations 24a may be formed initially by traversing the sheet 22c over one or more sets of knife edge rollers 23, one set shown in FIG. 8, so as to crease the sheet 22c to begin forming the corrugations 24a. The corrugations 24a are further developed by passing the sheet 22c through an apparatus 149 having opposed guide rollers 149a engageable with opposite sides of the sheet 22c. Suitable support rollers 149b are provided to guide and support the core part 22b. Second and third stage corrugation forming apparatus 151 and 153 may be provided, as shown in FIG. 8, to further develop and compress the corrugations 24a until the core part 22b is formed substantially like the core part 22, as shown in FIG. 2. Once the core part 22b is formed with its corrugations 24a fully compressed to be contiguous with each other, the core part has been substantially cooled from its temperature at the exit of extruder die 48a. Core part 22b may be subjected to further processing to form an article 20 in the same manner as described above for the embodiment wherein the core part 22 is initially formed with corrugations 24 by the extruder die 48.

One advantage of forming the core part 22b in the manner described above is that further cooling of the core part may take place before it is finally compressed, since the relatively thin sheet 22c will have its entire surface area exposed to cooling air circulation or other cooling fluids before the corrugations 24a are fully formed and compressed.

Preferred embodiments of an extruded, composite or plastic lumber article, a system for fabricating same and a method of fabricating same in accordance with the invention are believed to have been described in sufficient detail herein to enable one skilled in the art to practice the invention. Although an extruded composite or plastic wood or lumber article in accordance with the invention, as well as a system and method for the fabrication or formation thereof have been provided as described herein, those skilled in the art will recognize that various substitutions and modifications may be made to the articles 20 and 21, the system 42 and modifications thereto and the method described above without departing from the scope and spirit of the invention as set forth in the appended claims.

What is claimed is:

1. An extruded plastic lumber article comprising an elongated member of solid rectangular cross section, comprising:

a core part formed of a polymer material and having a cross-section formed of repeated corrugations extending from one transverse end of said core part to an opposite transverse end of said core part, said corrugations being formed by extrusion through an extrusion die having an extrusion orifice which is shaped to form said corrugations and valley portions between adjacent corrugations, said corrugations, as formed, being spaced from each other to provide said valley portions between adjacent corrugations and said corrugations are compressed toward each other to eliminate said valley portions between said adjacent corrugations after extrusion through said extrusion die whereby said adjacent corrugations are contiguous with each other such that said core part comprises a solid mass extending from said one transverse end to said opposite transverse end, said corrugations also extend from said one transverse end to said opposite transverse end across the width of said article and said corrugations extend parallel to each other along the length of said article; and a polymer coating disposed over the surfaces of said core part to completely encapsulate said core part and to form said article of said solid rectangular cross section delimited by a first pair of opposed parallel surfaces and a second pair of opposed parallel surfaces.

2. The article set forth in claim 1 wherein:

at least one pair of said opposed parallel surfaces are embossed.

3. The article set forth in claim 1 wherein:

the composition of one of said core part and said coating comprises one of reinforced polyethylene and polypropylene.

4. The article set forth in claim 3 wherein:

said one of said reinforced polyethylene and polypropylene is reinforced by wood particles.

5. The article set forth in claim 4 wherein:

the composition of said core part and said coating comprises about 25% wood flour and 75% polypropylene, by weight.

6. The article set forth in claim 1 wherein:

said article is reinforced by at least one sheet of metal foil disposed between said core part and said coating.

7. An extruded plastic lumber article comprising an elongated member of solid rectangular cross section, comprising:

a core part formed of a polymer material and having a cross-section formed of repeated corrugations extending from one transverse end of said core part to an opposite transverse end of said core part, said corrugations being formed by extrusion through an extrusion die having an extrusion orifice which is shaped to form said corrugations and valley portions between adjacent corrugations, said corrugations, as formed, being spaced from each other to provide said valley portions between adjacent corrugations and said corrugations are compressed toward each other to eliminate said valley portions between said adjacent corrugations after extrusion through said extrusion die whereby said adjacent corrugations are contiguous with each other such that said core part comprises a solid mass extending from said one transverse end to said opposite transverse end, said corrugations extend from said one transverse end to said opposite transverse end across the width of said article and said corrugations extend parallel to each other along the length of said article;

a polymer coating disposed over the surfaces of said core part to completely encapsulate said core part and to form said article of said solid rectangular cross section delimited by a first pair of opposed parallel surfaces and a second pair of opposed parallel surfaces;

at least one pair of said opposed parallel surfaces are embossed to simulate a lumber article; and the composition of one of said core part and said coating comprises one of reinforced polyethylene and polypropylene.

8. The article set forth in claim 7 wherein:

the composition of said core part and said coating comprises about 25% wood flour and 75% polypropylene, by weight.

9. The article set forth in claim 7 wherein:

said article is reinforced by at least one sheet of metal foil disposed between said core part and said coating.

* * * * *